(12) United States Patent
Hughes et al.

(10) Patent No.: US 6,268,314 B1
(45) Date of Patent: *Jul. 31, 2001

(54) FOAMABLE GEL COMPOSITION

(75) Inventors: Trevor Lloyd Hughes, Cambridge; Stephen Nigel Davies, Over, both of (GB); Francois Friedmann, Manhatten Beach, CA (US)

(73) Assignee: Schlumberger Technology Corporation, Sugar Land, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/961,046

(22) Filed: Oct. 30, 1997

(30) Foreign Application Priority Data

Nov. 1, 1996 (GB) .................................................. 9622794

(51) Int. Cl.[7] ................................ C09K 3/00; E21B 43/22

(52) U.S. Cl. ..................... 507/202; 507/903; 166/270; 166/309

(58) Field of Search .................................. 507/202, 101, 507/903; 166/309, 270

(56) References Cited

U.S. PATENT DOCUMENTS

| | | | | |
|---|---|---|---|---|
| 4,683,949 | * | 8/1987 | Sydansk et al. | 507/202 |
| 5,105,884 | * | 4/1992 | Sydansk | 507/202 |
| 5,203,834 | * | 4/1993 | Hutchins et al. | 166/309 |
| 5,486,312 | * | 1/1996 | Sandiford et al. | 507/202 |
| 5,513,705 | * | 5/1996 | Djabbarah et al | 507/202 |
| 5,542,474 | * | 8/1996 | Djabbarah et al. | 166/309 |
| 5,780,395 | * | 7/1998 | Sydansk | 507/202 |

* cited by examiner

Primary Examiner—Philip Tucker
(74) Attorney, Agent, or Firm—Robin C. Nava; Thomas O. Mitchell

(57) ABSTRACT

A $CO_2$-foamable gelling composition and use of said composition for conformance control operations are described The gelling fluid comprises a decomposing agent to counteract the detrimental effect of $CO_2$ on the gelling process.

36 Claims, 1 Drawing Sheet

FOAMABLE GEL COMPOSITION

Figure 1:
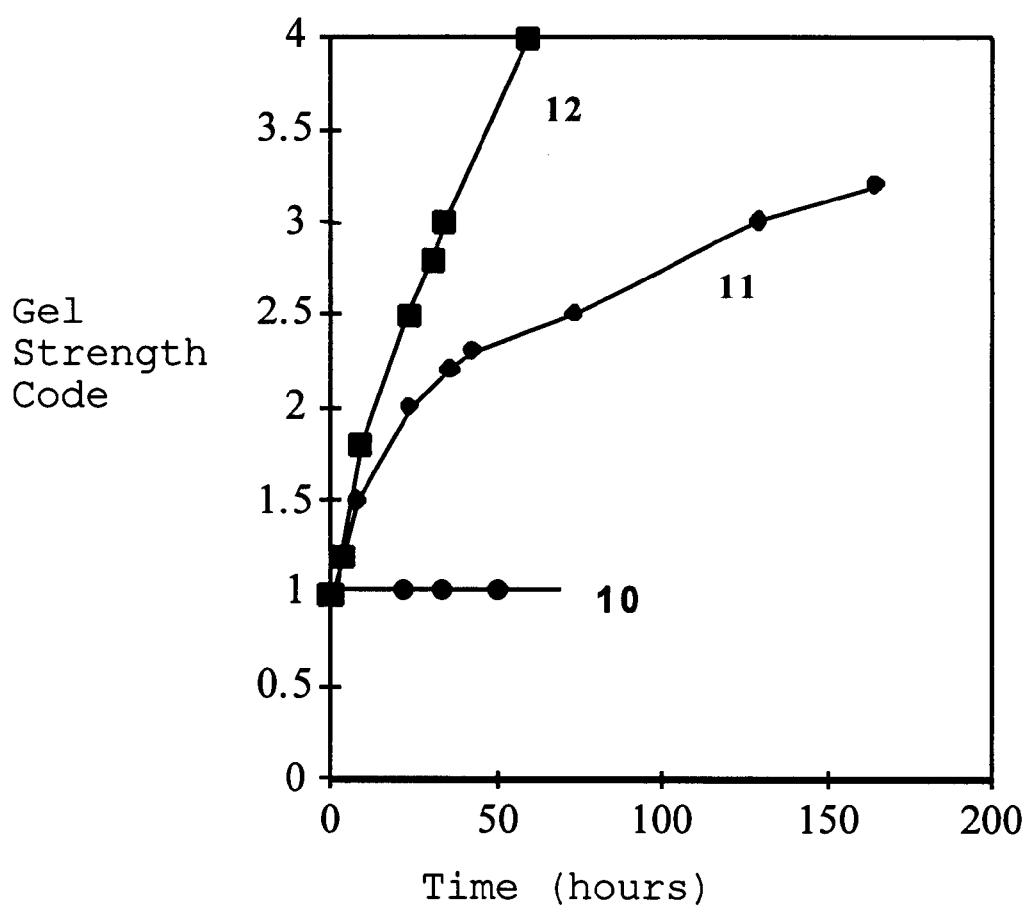

The present invention relates to a foamable gel composition utilized for improving the production of subterranean hydrocarbon reservoirs. More specifically it relates to a gel foamable by a gas containing carbon dioxide. Even more specifically it pertains to a $CO_2$-foamable gel composition used for conformance control.

BACKGROUND OF THE INVENTION

The injection of displacement fluids into subterranean hydrocarbon-bearing formations to promote the production of hydrocarbons therefrom is well known. Water and various gases, in addition to more complex fluids, such as surfactant solutions and polymer solutions, are common displacement fluids utilized in both miscible and immiscible oil displacement floods.

When a displacement fluid is injected into a formation has high and low permeability flow paths, the fluid be substantially diverted away from the low permeability flow paths. As a consequence, the displacement fluid does not sweep the low permeability flow paths and the sweep efficiency of the displacement fluid in the formation is poor. Conformance control techniques are employed to improve the sweep efficiency on a macroscopic scale, i.e., by effectively blocking the high permeability flow paths, such as fissure/fracture networks.

Polymer gels have been widely used for conformance control of naturally fissured/fractured reservoirs. For an overview of existing polymer compositions, reference is made to the U.S. Pat. Nos. 5,486,312 and 5,203,834 which also list a number of patents and other sources related to gel-forming polymers.

In an effort to reduce the cost of the gelling system without substantially diminishing the effectiveness of the treatment, attempts are known to at least partially substitute the polymer by a less expensive component. One way, which is of specific interest with regard to the present invention, are foamable gel compositions as described for example in the U.S. Pat. Nos. 5,105,884, 5,203,834, and 5,513,705, wherein the polymer content is reduced at constant volume of the composition.

The typical components of a foamable gel composition are (a) a solvent, (b) a crosslinkable polymer, (c) a crosslinking agent capable of crosslinking the polymer, (d) a surfactant to reduce the surface tension between the solvent and the gas, and (e) the foaming gas, itself.

U.S. Pat. No. 5,105,884 describes foamed gel systems based on partially hydrolyzed polyacrylamide PHPA crosslinked with Cr(III) acetate. With regard to the foaming gas, all four examplatory systems employ nitrogen ($N_2$), though $CO_2$ is mentioned as an alternative.

The use of $CO_2$ as foaming gas is desirable from an economic viewpoint, as this gas is used in many gas injection projects designed to generate an external fluid drive in the reservoir. Therefore an economic source of $CO_2$ would in principle be available for the gel foaming step. However, experiments with known gel systems showed that $CO_2$ when used as foaming gas has a considerable impact on the stability of the gelling system. In contrast to $N_2$, $CO_2$ exhibits significant solubility in both water and oil. When $CO_2$ dissolves in water, it is converted to carbonic acid. It was found that known formulations for gelling systems either failed to gel in the presence of $CO_2$ gas or resulted in a gel with reduced long-term stability.

It is therefore an object of the invention to provide a $CO_2$ foamable gelling composition. It is a particular object of the invention to provide a cost-efficient composition with sufficient long-term stability to be useable in conformance control applications.

SUMMARY OF THE INVENTION

The above-mentioned objects are achieved by a $CO_2$-foamable gelling system. It is regarded as an important feature of the invention that the new gelling system comprises a component which decomposes under downhole conditions to release bicarbonate.

Particularly suitable decomposing agents for the purpose of the present invention are urea or derivatives of urea, sodium cyanate, and mixtures, thereof. In a preferred embodiment of the invention, the decomposing agent is chosen so as to stabilize the pH of the gelling system between 4 and 4.5.

From the numerous polymers known to provide a stable gel, it was found that water soluble polyacrylamide (PA) in combination with a Cr(III) based crosslinking agent can be used with particular advantage. In a preferred embodiment, partially hydrolyzed polyacrylamide (PHPA), even more preferably PHPA with an initial degree of hydrolysis in the range of 0.1–2.5%, is used as gelling polymer.

It was further found that in contrast to the nitrogen-foamed gelling system as described for example in U.S. Pat. No. 5,105,884, the $CO_2$ gas has a strong and often detrimental impact on the effectiveness of the surfactant in the gelation process. As a result of the failure of most of the known surfactants, a preferred embodiment of the invention comprises alcohol ether sulfates (AES) as surfactant. Alcohol ether sulfates provide a good foaming performance in acid brines with a broad range of ionic strength and hardness. They allow the liquid phase of the foam to form a strong and robust gel under acid conditions.

These and other features of the invention, preferred embodiments and variants thereof, possible applications and advantages will become appreciated and understood by those skilled in the art from the detailed description and drawings following below.

DRAWING

FIG. 1 shows the gel strength of a gelling composition in accordance with the invention in dependence of the amount of added decomposing agent (urea).

EXAMPLES

Measured data showed that $CO_2$ dissolution can reduce the equilibrium pH of a brine so that it is below a critical gelation pH for the $CO_2$-foamed gelling composition. Below the critical gelation pH the composition fails to gel. For the preferred PHPA/Cr(III)/AES system, the critical gelation pH is 4–4.5, whereas the $CO_2$ gas reduces the pH to under 4—a value which varies depending on the bicarbonate content of the brine.

Since the bicarbonate content of typical formation brines can vary in the range 0.0002–0.18 mol/l, an internal buffer is required to ensure that the preferred system forms a robust and competent gel under a broad range of reservoir conditions. One method to ensure that the downhole pH is above the critical gelation pH is to add bicarbonate to the mixwater. In practice, this approach is difficult to implement. The addition of bicarbonate (sodium or ammonium salt) to a typical formation brine at surface is likely to cause precipitation of insoluble carbonates such as calcite. More importantly, the addition of Cr(III)carboxylate crosslinker to the bicarbonate-rich brine is likely to cause the precipitation of Cr(III)carbonate so that the Cr(III) concentration in solution is too low to form the gel.

An alternative method to control downhole pH, without causing precipitation at surface, is to add the salt of a weak acid to the brine. Examples are formate or acetate (sodium or ammonium salt). In practice, this approach is also unsuitable as a large excess of carboxylate ligands, L, inhibits gelation by shifting the equilibrium:

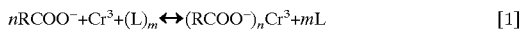

$$nRCOO^- + Cr^{3+}(L)_m \leftrightarrow (RCOO^-)_n Cr^{3+} + mL \quad [1]$$

The preferred method to ensure that the downhole pH is above the critical gelation pH is to add a readily soluble compound which is non-reactive at surface but which subsequently decomposes, under downhole pressure and temperature conditions, to release the required pH buffer. Examples which decompose to form the bicarbonate buffer are urea (carbamide) and derivatives of urea such as 1,3-dimethyl urea. Under acid conditions, urea decomposes via the reaction:

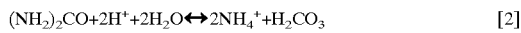

$$(NH_2)_2CO + 2H^+ + 2H_2O \leftrightarrow 2NH_4^+ + H_2CO_3 \quad [2]$$

The rate of this reaction depends on temperature such that urea is stable at typical surface temperatures but decomposes to release the bicarbonate buffer when the temperature increases above $^a 120°$ F. For situations where a controlled release of the buffer is required at lower temperatures (<120° F.), sodium cyanate or a sodium cyanate/urea mixture can be used.

A transparent high pressure cell was used to test the performance of the controlled release buffer system under typical reservoir conditions. As a control, a system containing 7 g/l polymer (DH=1%), 127 ppm Cr(III)acetate and 0.5 wt % AES (prepared in the brine containing 29800 ppm NaCl, 1250 ppm $HCO_3^-$ and 1040 ppm $Ca^{++}$) was aged at $P(CO_2)=2000$ psi [13.8 MPa] and T=160° F. In accordance with the measurements described above, this system did not form a gel as its pH (estimated to be 3.75) is below the critical gelation pH.

With urea, in a concentration of 3 g/l (curve 11) and 15 g/l (curve 12), respectively, is added to the same system, under the same gas ($CO_2$) pressure and temperature conditions, the fluid evolves to form a crosslinked gel (see FIG. 1). The gel strength in FIG. 1 is measured in index numbers. A gel strength of above 4 for a period exceeding 1000 h is desirable for conformance control applications. The figure also demonstrates that the decomposition rate of the urea increases with initial urea concentration.

It is also possible to replace the urea in the aforementioned example by an equivalent amount, i.e., 4.4 g/l of dimethylurea (DMU), or 6.5 g/l of sodium cyanate. The latter example is advantageously applicable under low temperature conditions. In further examples, the crosslinking agent is replaced by an equivalent amount of Cr(III) propionate.

Furthermore, coreflood experiments were performed to confirm the importance of the decomposing agent.

Two sandpacks (each 1 foot in length and 1 inch in diameter) were initially saturated with the brine containing 29800 ppm NaCl, 1250 ppm $HCO_3^-$ and 1040 ppm $Ca^{++}$; the measured brine permeability of both packs was 16 Darcy. At $P(CO_2)=2000$ psi [13.8 MPa] and T=160° F., a 92 vol % $CO_2$/8 vol % brine mixture was then coinjected through each pack; at steady state conditions, the brine saturation was reduced to 40 vol % of the pore space in both packs. A 92 vol % $CO_2$/8 vol % foam-gel mixture was then coinjected through each pack. The liquid phase of the foam loaded into both sandpacks contained 7 g/l PHPA with DH 1–2%, 0.56 g/l $Cr(Ac)_3$, 0.5 wt % AES in the brine containing 29800 ppm NaCl, 1250 ppm $HCO_3^-$ and 1040 ppm $Ca^{++}$. Coinjection of the $CO_2$/foam-gel mixture generates a foam which becomes evenly distributed throughout the pore space. A controlled release buffer component was not included in the liquid phase of the foam loaded into Pack 1; as a result, the in-situ pH of the liquid phase of this foam dropped to approximately 3.7, i.e., below the critical gelation pH of the system. A controlled release buffer component (urea) was included in the liquid phase of the foam loaded into Pack 2; the urea increases the bicarbonate concentration in the liquid phase of the foam by 0.05 mol/l so that the in-situ pH of the system stabilized at approximately 4.5, i.e., above the critical gelation pH of the system. After 400 hours aging, the flow resistance of the foam/foamed gel in Packs 1 and 2 was measured by injecting the 80 vol % $CO_2$/20 vol % brine mixture at a series of constant pressures. A resistance factor (RF), defined by the ratio of the permeability of the pack before and after the foamed gel treatment, is computed at each applied pressure gradient. The measured resistance factors as a function of applied pressure gradient and the critical (failure) pressure gradient for both systems are given in the following table.

TABLE 1

| Pressure Gradient | Flow resistance (RF) | |
|---|---|---|
| in psi/ft [MPa/m] | + urea | −urea |
| 10 [0.23] | 6667 | breakthrough |
| 50 [1.13] | 6667 | — |
| 70 [1.61] | 10000 | — |
| 75 [1.72] | 10000 | — |
| 80 [1.84] | 10000 | — |
| 110 [2.53] | 1429 (breakthrough) | — |
| 120 [2.76] | 500 | — |

The system containing the decomposing urea creates a competent foamed gel barrier which has a critical (failure) pressure gradient of 110 psi/ft [2.53 MPa/m]. In contrast, the lower pH system without the decomposing agent does not develop a competent foamed gel so that the 80 vol % $CO_2$/20 vol % brine mixture penetrates the pack at the lowest applied pressure gradient (10 psi/ft) [0.23 MPa/m].

A further example underlines the importance of using a partially hydrolyzed polyacrylamide polymer with an initial degree of hydrolysis in the range 0.1–2.5% in the preferred $CO_2$-foamed system.

In a procedure similar to the one described before and under equal pH conditions, two sandpacks (each 1 foot in length and 1 inch in diameter) were initially saturated with the brine containing 29800 ppm NaCl, 1250 ppm $HCO_3^-$ and 1040 ppm $Ca^{++}$; the measured brine permeability of both packs was 16 Darcy. Under the conditions $P(CO_2)=$ 2000 psi [13.8 MPa] and T=160° F., a 92 vol % $CO_2$/8 vol % brine mixture was then coinjected through each pack. At steady state conditions, the brine saturation was reduced to 40 vol % of the pore space in both packs. A 92 vol % $CO_2$/8 vol % foam-gel mixture was then coinjected through each pack; the foam-gel liquid phase contained 7 g/l polymer (DH 10–12%), 0.35 g/l $Cr(Ac)_3$ and 1 wt % AES. Coinjection of the $CO_2$/foam-gel mixture generates a foam which becomes evenly distributed throughout the pore space. After foam injection, the in-situ gas content of the foam in Pack 1 and Pack 2 was 80 vol % and 70 vol %, respectively. With time the in-situ foam evolves to form a foamed gel. For each pack, the flow resistance of the foamed gel was measured by injecting the 92 vol % $CO_2$/8 vol % brine mixture at a series of constant pressures. At a critical applied pressure gradient, the foamed gel fails allowing the gas and/or liquid to breakthrough the pack. As before, a resistance factor (RF), defined by the ratio of the permeability of the pack before and after the foamed gel treatment, is computed at each applied pressure gradient.

In the present example, the flow resistance of Pack 1 and Pack 2 was measured after aging the in-situ foam for 19.5 and 46.5 hours, respectively. The data are given in Table 2.

TABLE 2

| Pressure Gradient | Flow resistance (RF) after | |
|---|---|---|
| in psi/ft [MPa/m] | 19.5 h | 46.5 h |
| 1 [0.023] | — | 141 |
| 2.5 [0.058] | — | 3.2 |
| 6 [0.14] | — | breakthrough |
| 20–30 [0.46–0.69] | 180000 | — |
| 40–50 [0.92–1.15] | 316000 | — |
| 53 [1.219] | (breakthrough) | — |

After 19.5 hours, the freshly formed foamed gel imparts a high resistance factor until the applied pressure gradient is increased to 53 psi/ft [1.219 MPa/m]. However, after 46.5 hours, the foamed gel has weakened under the prevailing acid conditions such that it fails at an applied pressure gradient of 6 psi/ft [0.14 MPa/m]. These experiments confirm that for a $CO_2$-foamed system it is advantageous to use based a polymer with a degree of hydrolysis below 10%.

Other measurements performed on unfoamed gelling systems with PHPA of 10–12% indicated that, after the rapid initial formation of a strong gel, the gel subsequently degrades under the prevailing acid conditions.

A further example compares the gelation behavior of five different formulations, containing four different surfactants, all of which are chemically compatible with a PHPA/Cr(III) based gelling system. (Chemical incompatibility is diagnosed by the development of a turbid solution and/or significant precipitation.) The surfactant are the preferred alcohol ether sulfate(AES), a mixed alkyl sulfonate surfactant (MAS) and two different high cloud point non-ionic surfactants (NI1 and NI2)). Details of the formulations are given below in Table 3:

TABLE 3

| SURFACTANT | AES | MAS | MAS | NI1 | NI2 |
|---|---|---|---|---|---|
| CONCENTRATION (in wt %) | 0.5 | 0.25 | 0.5 | 0.5 | 0.5 |
| [Cr(III)] (in ppm) | 127 | 127 | 260 | 127 | 127 |

All formulations were based on 7 g/l PHPA (DH=1%); pH 4.50+/−0.05; T=160° F.; brine containing 29800 ppm NaCl, 1250 ppm $HCO_3^-$ and 1040 ppm $Ca^{++}$.

Both the non-ionic surfactants (NI1 and NI2) completely inhibit gelation of the system. The mixed alkyl sulfonate surfactant causes a long gelation delay (even when the crosslinker/surfactant ratio in the fluid is twice that in the fluids containing AES) and when fully formed, the MAS gels are significantly weaker (with a gel strength of 3 using the same definition as introduced with respect to FIG. 1 above) than those formed from the fluids containing AES (gel strength 5–6).

In a further example in accordance with the invention the Cr(III)acetate was mixed with sodium lactate yielding a more delayed conversion of the foam to a foamed gel.

We claim:
1. A $CO_2$-foamable gelling composition comprising:
   (a) a water soluble polymer;
   (b) a crosslinking agent for said polymer;
   (c) a surfactant; and
   (d) a decomposing agent, which controls downhole pH to permit gelation and downhole buffering and which decomposes under subterranean conditions, but not surface conditions, to release bicarbonate, in an amount effective to buffer the composition, in the presence of foamant $CO_2$ in the composition, at a pH above the critical gelation pH of the composition,
   said gelling composition being foamed by carbon dioxide.
2. The composition of claim 1 comprising a brine containing $CO_2$.
3. The composition of claim 1 in which the decomposing agent comprises urea and derivatives thereof which release bicarbonates.
4. The composition of claim 2 in which the decomposing agent is selected from the group consisting of sodium cyanate, urea, urea derivatives which release bicarbonates, and mixtures thereof.
5. The composition of claim 4 wherein the water-soluble polymer comprises 0.1 to 2.5 percent of hydrolyzed carboxylate side groups.
6. The composition of claim 4 wherein the polymer comprises polyacrylamide.
7. The composition of claim 6 wherein the polyacrylamide comprises a partially hydrolyzed polyacrylamide containing 0.1 to 2.5 percent of hydrolyzed carbon side chains.
8. The composition of claim 5 wherein the surfactant comprises alcohol ether sulfates.
9. The composition of claim 6 wherein the surfactant comprises alcohol ether sulfates.
10. The composition of claim 7 wherein the crosslinking agent is based on Cr(III).
11. The composition of claim 8 wherein the crosslinking agent is based on Cr(III).
12. The composition of claim 9 wherein the crosslinking agent is based on Cr(III), and the critical gelation pH is from 4.0 to 4.5.
13. A $CO_2$-foamable gelling composition formed by blending:
   (a) a water soluble polymer;
   (b) a crosslinking agent for said polymer;
   (c) a surfactant; and
   (d) a decomposing agent, which controls downhole pH to permit gelation and downhole buffering and which decomposes under subterranean conditions, but not surface conditions, to release bicarbonate, in an amount effective to buffer the composition, in the presence of foamant $CO_2$ in the composition, at a pH above the critical gelation pH of the composition,
   said gelling composition being foamed by carbon dioxide.
14. The composition of claim 13 comprising a brine containing $CO_2$.
15. The composition of claim 13 in which the decomposing agent comprises urea and derivatives thereof which release bicarbonates.

16. The composition of claim 14 in which the decomposing agent is selected from the group consisting of sodium cyanate, urea, urea derivatives which release bicarbonates, and mixtures thereof.

17. The composition of claim 16 wherein the water-soluble polymer comprises 0.1 to 2.5 percent of hydrolyzed carboxylate side groups.

18. The composition of claim 16 wherein the polymer comprises polyacrylamide.

19. The composition of claim 18 wherein the polyacrylamide comprises a partially hydrolyzed polyacrylamide containing 0.1 to 2.5 percent of hydrolyzed carbon side chains.

20. The composition of claim 17 wherein the surfactant comprises alcohol ether sulfates.

21. The composition of claim 19 wherein the surfactant comprises alcohol ether sulfates.

22. The composition of claim 19 wherein the crosslinking agent is based on Cr(III).

23. The composition of claim 20 wherein the crosslinking agent is based on Cr(III).

24. The composition of claim 21 wherein the crosslinking agent is based on Cr(III).

25. A method of controlling conformance in a producing wellbore, including the step of injecting a driving fluid through an injector wellbore, comprising (a) providing a gelling composition which is foamed with $CO_2$, the gelling composition formed by blending
  (i) a water soluble polymer;
  (ii) a crosslinking agent for said polymer;
  (iii) a surfactant; and
  (iv) a decomposing agent, which decomposes under subterranean conditions, but not surface conditions, to release bicarbonate, in an amount effective to buffer the composition, in the presence of foamant $CO_2$ in the composition, at a pH above the critical gelation pH of the composition;

(b) injecting the gelling composition into a subterranean formation through said injector wellbore and forming a buffered gelling composition downhole, by decomposition of said decomposing agent, to block high permeability zones; and (c) resuming injection of said driving fluid.

26. The method of claim 25 in which the composition comprises a brine containing $CO_2$.

27. The method of claim 25 in which the decomposing agent comprises urea and derivatives thereof which release bicarbonates.

28. The method of claim 26 in which the decomposing agent is selected from the group consisting of sodium cyanate, urea, urea derivatives which release bicarbonates, and mixtures thereof.

29. The method of claim 28 wherein the water-soluble polymer comprises 0.1 to 2.5 percent of hydrolyzed carboxylate side groups.

30. The method of claim 28 wherein the polymer comprises polyacrylamide.

31. The method of claim 30 wherein the polyacrylamide comprises a partially hydrolyzed polyacrylamide containing 0.1 to 2.5 percent of hydrolyzed carbon side chains.

32. The method of claim 29 wherein the surfactant comprises alcohol ether sulfates.

33. The method of claim 30 wherein the surfactant comprises alcohol ether sulfates.

34. The method of claim 30 wherein the crosslinking agent is based on Cr(III).

35. The method of claim 32 wherein the crosslinking agent is based on Cr(III).

36. The method of claim 33 wherein the crosslinking agent is based on Cr(III), and the critical gelation pH is from 4.0 to 4.5.

* * * * *